United States Patent [19]

Kitajima

[11] Patent Number: 5,077,684
[45] Date of Patent: Dec. 31, 1991

[54] SYSTEM FOR ACCURATELY INFORMING EACH OF ADAPTERS OF ITS PACKAGED LOCATION

[75] Inventor: Tatsuya Kitajima, Tokyo, Japan

[73] Assignee: NEC Corporation, Tokyo, Japan

[21] Appl. No.: 437,694

[22] Filed: Nov. 17, 1989

[30] Foreign Application Priority Data

Nov. 19, 1988 [JP] Japan .................. 63-291107

[51] Int. Cl.$^5$ .................. G06F 13/00; G06F 12/00
[52] U.S. Cl. .................. 395/275; 364/929.4; 364/929.5; 364/926.93; 364/929; 364/967; 364/970; 364/DIG. 2; 340/825.52
[58] Field of Search ... 364/200 MS File, 900 MS File, 364/480, 488; 365/230.01; 361/380; 340/825.07, 825.52

[56] References Cited

U.S. PATENT DOCUMENTS

| | | | |
|---|---|---|---|
| 4,556,953 | 12/1985 | Caprio et al. | 364/900 |
| 4,562,535 | 12/1985 | Vincent et al. | 364/200 |
| 4,589,063 | 5/1986 | Shah et al. | 364/200 |
| 4,688,172 | 8/1987 | Wright | 364/200 |
| 4,701,878 | 10/1987 | Günkel et al. | 364/900 |
| 4,727,475 | 2/1988 | Kiremidjian | 364/200 |
| 4,755,934 | 7/1988 | Inoue | 364/200 |
| 4,964,038 | 10/1990 | Louis et al. | 364/200 |
| 4,992,976 | 2/1991 | Yonekura et al. | 364/900 |

Primary Examiner—Eddie P. Chan

Attorney, Agent, or Firm—Burns, Doane, Swecker & Mathis

[57] ABSTRACT

For use in informing each of zeroth through (N−1)-th adapters (N represents a positive integer) of its packaged location from a processor when the processor and the adapters are packaged on a backboard, the processor comprises a signal producer which produces first and second number signals. The first number signal represents an initial integer as a first number. The second number signal represents the initial integer plus an additional integer as a second number. The additional integer is selected from zero to (N−1). The zeroth adapter comprises a detecting circuit, a judging circuit, an adder, and an internal connection line. The detecting circuit detects the first number to produce a detection signal representative of the first number. The judging circuit judges whether or not the detection signal is coincident with the second number signal to produce a coincidence signal when the detection signal is coincident with the second number signal. The coincidence signal represents that the first number represented by the detection signal indicates the packaged location of the zeroth adapter. The adder produces a sum signal representative of a sum of the first number and one and delivers the sum signal to a succeeding adapter which succeeds the zeroth adapter. Supplied with the second number signal, the internal connection line delivers the second number signal to the succeeding adapter as it is. The succeeding adapter is similar in structure and in operation to the zeroth adapter.

6 Claims, 3 Drawing Sheets

SYSTEM FOR ACCURATELY INFORMING EACH OF ADAPTERS OF ITS PACKAGED LOCATION

BACKGROUND OF THE INVENTION

This invention relates to a packaged location informing system for use in an input-output controller comprising a processor and a predetermined number of adapters with the processor and the adapters packaged on a backboard. The packaged location informing system is for use in informing each of the adapters of its packaged location from the processor.

On packaging the processor and the adapters on the backboard, the processor and the adapters are usually packaged in locations of the backboard in a predetermined packaging fashion. Inasmuch as determination is preliminarily made as regards locations where the processor and the adapters should be packaged on the backboard in the above-mentioned case, a defect is unavoidable such that a restriction is imposed on a construction of the input-output controller.

In order to remove the defect, each of the processor and the adapters is conventionally provided with a manually programmable switch. A packaged location of the processor is manually set in the manually programmable switch of the processor. Likewise, a packaged location of each of the adapters is set in the manually programmable switch of the adapter in question as a set location. The adapter in question can detect the packaged location thereof with reference to the set location of the manually programmable switch with which the adapter in question is provided. Inasmuch as the packaged location is manually set in the manually programmable switch, a setting error of the packaged location inevitably occurs on setting the packaged location in the manually programmable switch. As a result, it is impossible to accurately detect the packaged location.

SUMMARY OF THE INVENTION

It is therefore an object of this invention to provide a packaged location informing system which is capable of accurately informing a packaged location from a processor to one of the adapters in an input-output processor.

It is another object of this invention to provide a packaged location informing system of the type described, which is capable of automatically informing the packaged location from the processor to the adapter under consideration.

It is still another object of this invention to provide a packaged location informing system of the type described, which makes it possible to select packaging locations among various locations on a backboard on packaging the processor and the adapters on the backboard.

Other objects of this invention will become clear as the description proceeds.

On describing the gist of this invention, it is possible to understand that a packaged location informing system is for use in an input-output controller comprising a processor and a predetermined number N of adapters packaged on a backboard, where N represents a positive integer. The packaged location informing system is for use in informing a packaged location of one of the adapters from the processor to the above-mentioned one of the adapters.

According to this invention, the backboard comprises in the above-understood packaged location informing system: a plurality of locations which are not less in number than the predetermined number N plus one and each of which has a first and a second input terminal and a first and a second output terminal; a first signal transmission line between the first output terminal of a preceding location of two adjacent ones of the plurality of locations and the first input terminal of a succeeding location of the two adjacent ones of the locations; and a second signal transmission line between the second output terminal of the preceding location and the second input terminal of the succeeding location. Each of the plurality of locations is capable of packaging one of the processor and the adapters. The processor comprises: signal producing means connected to the first and the second output terminals of the preceding location when the processor is packaged in the preceding location, the signal producing means being for producing a first and a second number signal, the first number signal representing an initial integer as a first number, the second number signal representing the initial integer plus an additional integer as a second number, said additional integer being selected from zero to (N−1), the signal producing means being for delivering the first and the second number signals to the first and the second output terminals of the preceding location, respectively. Each of the adapters comprises: detecting means connected to the first input terminal of the succeeding location when the adapter in question is packaged in the succeeding location, the detecting means being supplied with the first number signal through the first signal transmission line for detecting the first number to produce a detection signal representative of the first number; sum signal producing means connected to the first input and the first output terminals of the succeeding location when the adapter in question is packaged in the succeeding location for producing a sum signal representative of a sum of the first number and one to deliver the sum signal as the first number signal to the first output terminal of the succeeding location; an internal connection line between the second input and the second output terminals of the succeeding location when the adapter in question is packaged in the succeeding location; and judging means connected to the detecting means always and to the second input terminal of the succeeding location when the adapter in question is packaged in the succeeding location, the judging means being supplied with the second number signal through the second signal transmission line for judging whether or not the detection signal is coincident with the second number signal to produce a coincidence signal when the detection signal is coincident with the second number signal. The coincidence signal represents that the first number represented by the detection signal indicates the packaged location of the adapter in question.

DESCRIPTION OF THE PREFERRED EMBODIMENT

Figure 1:
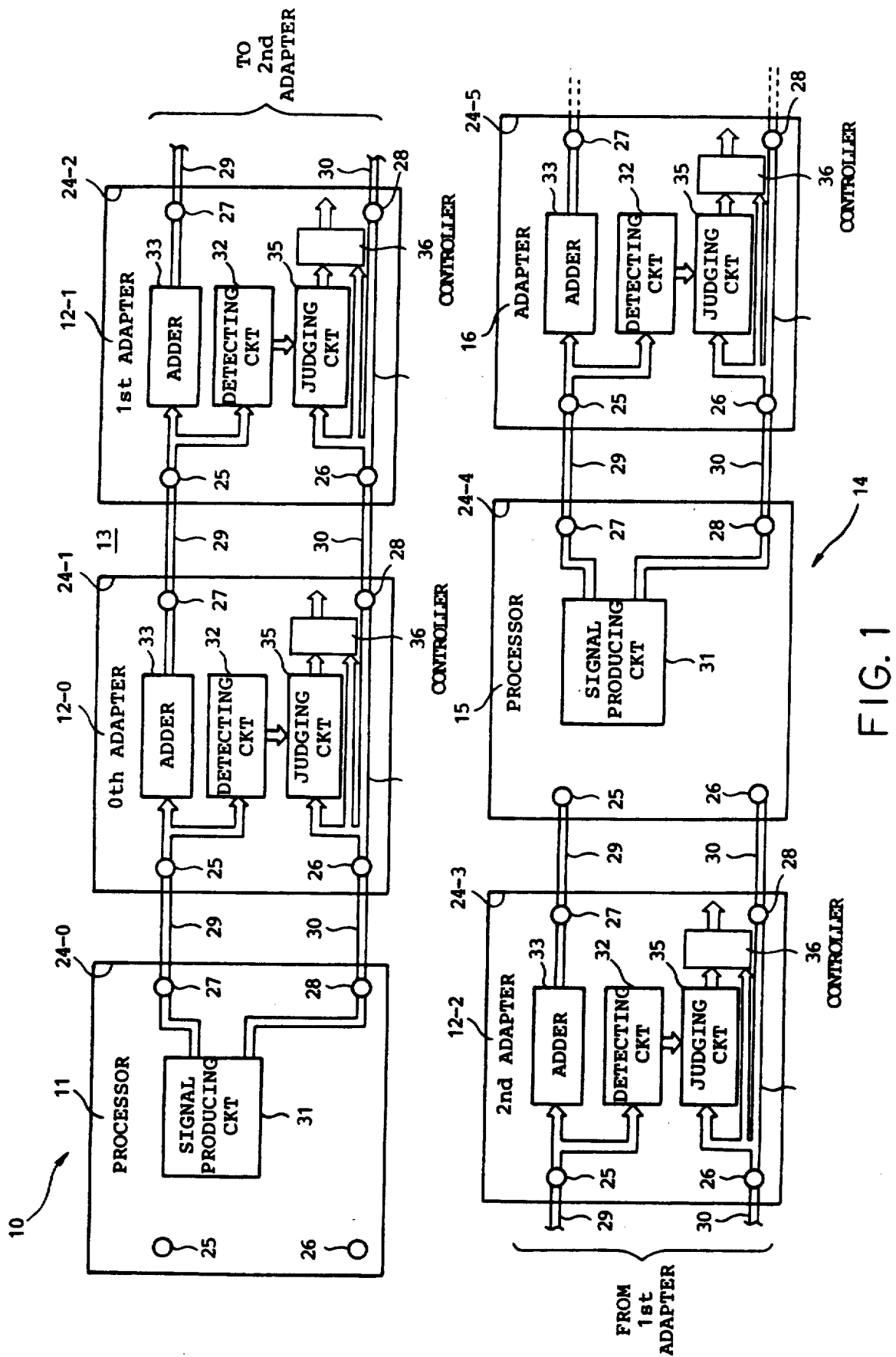
FIG. 1 is a block diagram of a packaged location informing system according to an embodiment of this invention.

Referring to FIG. 1, a packaged location informing system according to a preferred embodiment of this invention is for use in an input-output controller 10 which comprises a processor 11 and a predetermined number N of adapters, where N represents a positive integer. Inasmuch as the input-output controller 10 comprises zeroth through second adapters 12-0, 12-1, and 12-2 in the example being illustrated, the positive integer is equal to three. The processor 11 and the adapters 12 (suffixes omitted) are packaged on a backboard 13. The packaged location informing system is for use in informing a packaged location of one of the adapters 12 from the processor 11 to the above-mentioned one of the adapters 12. Another input-output controller 14 comprises a processor 15 and an adapter 16 with the processor 15 and the adapter 16 packaged on the backboard 13.

Figure 2:
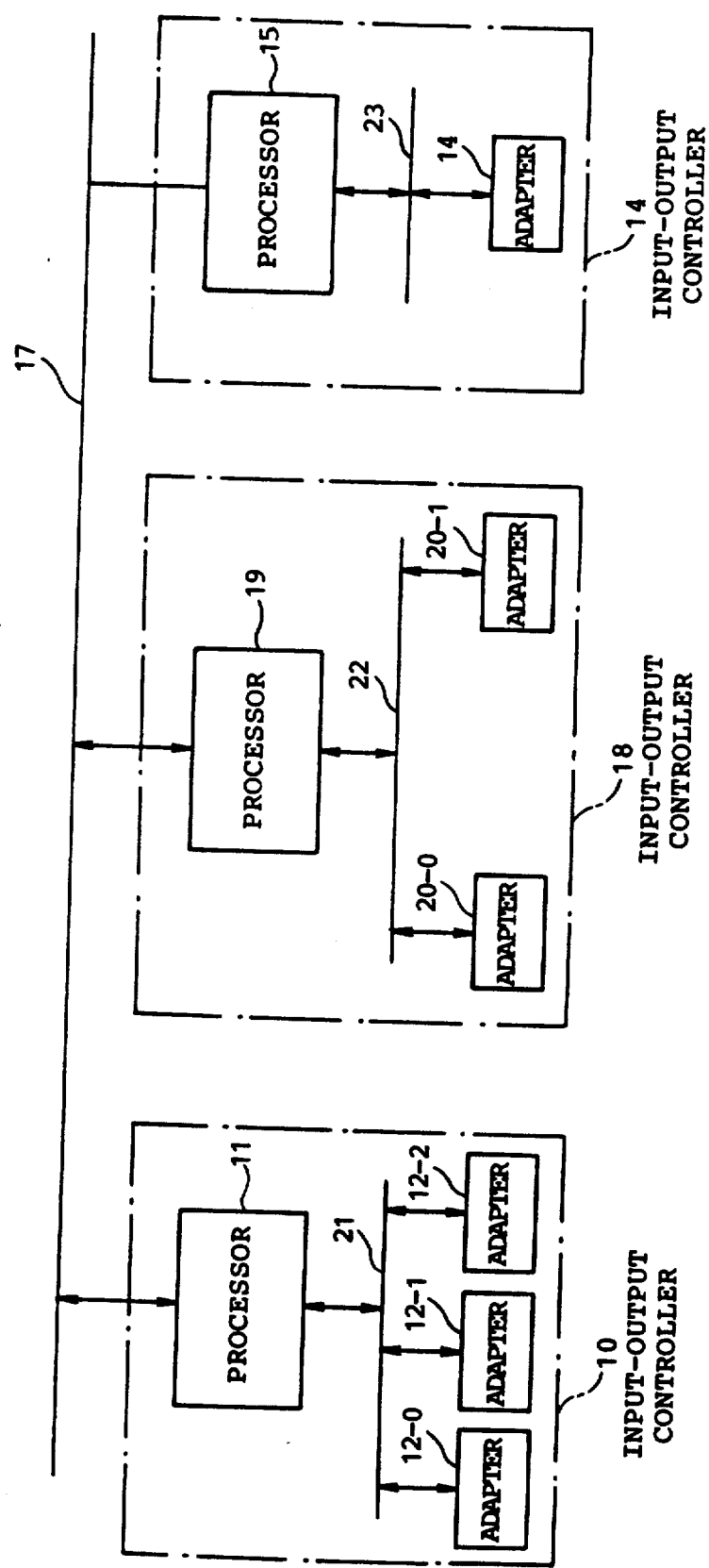
FIG. 2 is a block diagram of a system including an input-output controller to which the packaged location informing system illustrated in FIG. 1 is applicable.

Turning to FIG. 2, each of the input-output controllers 10 and 14 is connected to a general-purpose bus 17 when actually used. A different input-output controller 18 comprises a processor 19 and adapters 20-0 and 20-1 and is connected to the general-purpose bus 17.

Attention will be directed to the input-output controller 10. The processor 11 is connected to the general-purpose bus 17 and to an internal bus 21. Each of the adapters 12 is connected to the internal bus 21.

Likewise, each of the processor 19 and the adapters 20 (suffixes omitted) is connected to another internal bus 22 in the input-output controller 18. The processor 19 is connected to the general-purpose bus 17. In the input-output controller 14, the processor 15 is connected to the general-purpose bus 17 and to a different internal bus 23 while the adapter 16 is connected to the different internal bus 23. The input-output controllers 10 and 14 are located on the backboard 13 (FIG. 1) in the manner which will become clear as the description proceeds.

Turning back to FIG. 1, the backboard 13 comprises zeroth through fifth locations 24-0, 24-1, 24-2, 24-3, 24-4, and 24-5. The number of the locations 24 (suffixes omitted) is not less than the predetermined number N plus one. Inasmuch as the predetermined number N is equal to three in the illustrated example as mentioned above, the number of the locations 24 is not less than four. The locations 24 are determined typically by slots which are grooved into the backboard 13. Each of the locations 24 has first and second input terminals 25 and 26 and first and second output terminals 27 and 28. Each of the terminals 25, 26, 27, and 28 may be a pin fixed on the backboard 13.

The backboard 13 further comprises first and second signal transmission lines 29 and 30. Each of the first signal transmission lines 29 connects the first output terminal 27 of a preceding location, such as 24-0, of two adjacent ones of the locations 24 and the first input terminal 25 of a succeeding location, as 24-1, of the two adjacent ones of the locations 24 together. Each of the second signal transmission lines 30 connects the second output terminal 28 of the preceding location and the second input terminal 26 of the succeeding location together. Each of the locations 24 is capable of packaging one of the processor 11 and the adapters 12.

The processor 11 comprises a signal producing circuit 31 connected to the first and the second output terminals 27 and 28 of the preceding location when the processor 11 is packaged in the preceding location. In the illustrated example, the preceding location is the zeroth location 24-0. The signal producing circuit 31 is for producing first and second number signals and a control instruction signal. It will be seen that the processor 15 of the other input-output controller 14 is packaged in the fourth location 24-4, which will later be described.

The first number signal represents an initial integer as a first number. In the illustrated example, the initial integer is equal to zero. The first number signal therefore represents zero as the first number.

The second number signal represents the initial integer plus an additional integer as a second number. The additional integer is selected from zero to $(N-1)$. Inasmuch as N represents three in the illustrated example as mentioned above, the second number signal represents a selected one of zero through two as the second number. Thus, the second number indicates a particular one of the adapters 12 that the processor 11 should inform of the packaged location of the particular one of the adapters 12. The control instruction signal represents a control instruction which should be executed in the particular one of the adapters 12.

The signal producing circuit 31 delivers the first number signal to the first output terminal 27 of the preceding location 24-0 and the second number signal and the control instruction signal to the second output terminal 28 of the preceding location 24-0.

Attention will be directed to the zeroth adapter 12-0 among the adapters 12. Although description will be made only as regards the zeroth adapter 12-0, it should be understood that each of the first and the second adapters 12-1 and 12-2 is similar in structure and in operation to the zeroth adapter 12-0.

The zeroth adapter 12-0 comprises a detecting circuit 32 connected to the first input terminal 25 of the succeeding location when the zeroth adapter 12-0 is packaged in the succeeding location. In the illustrated example, the succeeding location is the first location 24-1. Supplied with the first number signal through the first signal transmission line 29, the detecting circuit 32 detects the first number to produce a detection signal representative of the first number.

An adder 33 is connected to the first input and the first output terminals 25 and 27 of the succeeding location 24-1 when the zeroth adapter 12-0 is packaged in the succeeding location 24-1. The adder 33 produces a sum signal representative of a sum of the first number and one and delivers the sum signal as the first number signal to the first output terminal 27 of the succeeding location 24-1. Thus, the adder 33 operates as a sum signal producing circuit which produces the sum signal as the first number signal to deliver the sum signal to the first output terminal of the succeeding location 24-1.

An internal connection line 34 connects the second input and the second output terminals 26 and 28 of the succeeding location 24-1 together when the zeroth adapter 12-0 is packaged in the succeeding location 12-0.

A judging circuit 35 is connected to the detecting circuit 32 always and to the second input terminal 26 of the succeeding location 24-1 when the zeroth adapter 12-0 is packaged in the succeeding location 24-1. Supplied with the second number signal through the second signal transmission line 30, the judging circuit 35 judges whether or not the detection signal is coincident with the second number signal. The judging circuit 35 thereby produces a coincidence signal when the detection signal is coincident with the second number signal. The coincidence signal represents that the first number represented by the detection signal indicates the packaged location of the zeroth adapter 24-1.

A controller 36 is connected to the judging circuit 35 always and to the second input terminal 26 of the succeeding location 24-1 when the zeroth adapter 12-0 is packaged in the succeeding location 24-1. The controller 36 executes a predetermined operation in accordance with the control instruction represented by the control instruction signal when the controller 36 is supplied with the coincidence signal.

The predetermined operation is, for example, a controlling operation for use in controlling an internal circuit (not illustrated) of the zeroth adapter 12-0. The internal circuit is independent of the detecting circuit 32, the adder 33, the judging circuit 35, and the controller 36. That is, the internal circuit is not connected to the detecting circuit 32, the adder 33, the judging circuit 35, and the controller 36 and is connected to the internal connection line 34 of the zeroth adapter 12-0 for carrying out an essential operation which is specific to the adapter 12-0.

Thus, the controller serves as a controllable operation executing circuit which executes the predetermined operation in accordance with the control instruction represented by the control instruction signal when supplied with the coincidence signal.

In the illustrated example, the coincidence signal is produced in the zeroth adapter 12-0 when the zeroth adapter 12-0 is supplied from the processor 11 through the second signal transmission line 30 with the second number signal representative of the second number which is equal to zero.

The first and the second adapters 12-1 and 12-2 are similar to the zeroth adapter 12-0 except that the first and the second adapters 12-1 and 12-2 are packaged in the second and the third locations 24-2 and 24-3, respectively. In the first adapater 12-1, the coincidence signal is produced when the first adapter 12-1 is supplied from the processor 11 through the zeroth adapter 12-0 with the second number signal representative of the second number which is equal to one. Likewise,, the coincidence signal is produced in the second adapter 12-2 when the second adapter 12-2 is supplied from the processor 11 through the zeroth and the first adapters 12-0 and 12-1 with the second number signal representative of the second number which is equal to two.

Attention will be directed to the input-output controller 14 which comprises the processor 15 and the adapter 16. The processor 15 is similar to the processor 11 except that the processor 15 is packaged in the fourth location 24-4. The adapter 16 is similar to the zeroth adapter 12-0 except that the adapter 16 is packaged in the fifth location 24-5.

Figure 3:
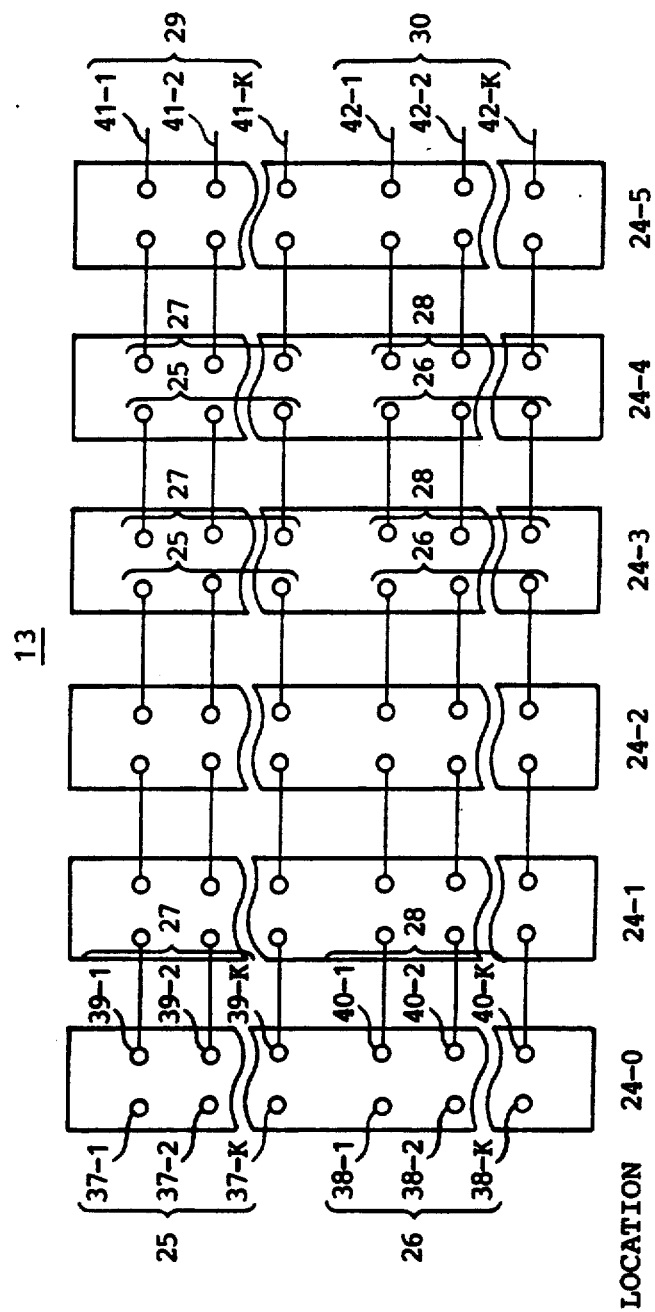
FIG. 3 is a front view of a backboard which is used in the packaged location informing system illustrated in FIG. 1.

Turning to FIG. 3, the backboard 13 will be described a little in detail. Each of the first input termina s 25 may be a combination of first through K-th partial input terminals 37-1 to 37-K, where K represents a natural number. Likewise, each of the second input terminals 26 may be another combination of first through L-th partial input terminals 38-1 to 38-L, where L represents another natural number. Each of the first output terminals 27 may be a combination of first through K-th partial output terminals 39-1 to 39-K while each of the second output terminals 26 may be another combination of first through L-th partial output terminals 40-1 to 40-L.

Each of the first signal transmission lines 29 may be a combination of first through K-th partial transmission lines 41-1 to 41-K while each of the second signal transmission lines 30 may be another combination of first through L-th partial transmission lines 42-1 to 42-L.

The first partial transmission line 41-1 of the first signal transmission line 29 is connected between the first partial output terminal 39-1 of the preceding location of two adjacent ones of the locations 24 and the first partial input terminal 37-1 of the succeeding location of the above-mentioned two adjacent ones of the locations 24. Likewise, the K-th partial transmission line 41-K of the first signal transmission line 29 is connected between the K-th partial output terminal 39-K of the preceding location and the K-th partial input terminal 37-K of the succeeding location. Similarly, the L-th partial transmission line 42-L of the second signal transmission line 30 is connected between the L-th partial output terminal 40-L of the preceding location and the L-th partial input terminal 38-L of the succeeding location. The first through the K-th partial transmission lines 42-1 to 42-L are operable in combination with the internal connection lines 34 (FIG. 1) as either the internal bus 21 (FIG. 2) or the different internal bus 23 (FIG. 2). In such a case, each of the internal connection lines 34 should be a combination of first through L-th partial connection lines.

While this invention has thus far been described in conjunction with a preferred embodiment thereof, it will readily be possible for those skilled in the art to put this invention into practice in various other manners. For example, the signal producing circuit 31 of the processor 11 may produce the first number signal representative of the initial integer which is equal to one rather than zero. In this case, the processor 11 produces the second number signal representing the additional integer plus one which is represented by the first number signal as the initial integer.

What is claimed is:

1. In a packaged location informing system for use in an input-output controller comprising a processor and a predetermined number N of adapters packaged on a backboard, where N represents a positive integer, said packaged location informing system being for use in informing a packaged location of one of said adapters from said processor to said one of the adapters, the improvement wherein:

said backboard comprises:
 a plurality of locations which are not less in number than said predetermined number N plus one and each of which has a first and a second input terminal and a first and a second output terminal;
 a first signal transmission line between the first output terminal of a preceding location of two adjacent ones of said plurality of locations and the first input terminal of a succeeding location of said two adjacent ones of the locations; and
 a second signal transmission line between the second output terminal of said preceding location and the second input terminal of said succeeding location;
 each of said plurality of locations being capable of packaging one of said processor and said adapters;
said processor comprising:
 signal producing means connected to the first and the second output terminals of said preceding location when sid processor is packaged in said preceding location, said signal producing means being for producing a first and a second number signal, said first number signal representing an initial integer as a first number, said second number signal representing said initial integer plus an additional integer as a second number, said additional integer being selected from zero to (N−1), said signal producing means being for delivering said first and said second number signals to the first and the second output terminals of said preceding location, respectively;

each of said adapters comprising:

detecting means connected to the first input terminal of said succeeding location when said each of the adapters is packaged in said succeeding location, said detecting means being supplied with said first number signal through said first signal transmission line for detecting said first number to produce a detection signal representative of said first number;

sum signal producing means connected to the first input and the first output terminals of said succeeding location when said each of the adapters is packaged in said succeeding location for producing a sum signal representative of a sum of said first number and one to deliver said sum signal as said first number signal to the first output terminal of said succeeding location;

an internal connection line between the second input and the second output terminals of said succeeding location when said each of the adapters is packaged in said succeeding location; and juding means connected to said detecting means always and to the second input terminal of said succeeding location when said each of the adapters is packaged in said succeeding location, said judging means being supplied with said second number signal through said second signal transmission line for judging whether or not said detection signal is coincident with said second number signal to produce a coincidence signal when said detection signal is coincident with said second number signal, said coincidence signal representing that the first number represented by said detection signal indicates the packaged location of said each of the adapters.

2. A packaged location informing system as claimed in claim 1, wherein said initial integer is equal to zero.

3. A packaged location informing system as claimed in claim 1, wherein said initial integer is equal to one.

4. In a packaged location informing system for use in an input-output controller comprising a processor and a predetermined number N of adapters packaged on a backboard, where N represents a positive integer, said packaged location informing system being for use in informing a packaged location of one of said adapters from said processor to said one of the adapters, the improvement wherein;

said backboard comprises:

a plurality of locations which are not less in number than said predetermined number N plus one and each of which has a first and a second input terminal and a first and a second output terminal;

a first signal transmission line between the first output terminal of a preceding location of two adjacent ones of said plurality of locations and the first input terminal of a succeeding location of said two adjacent ones of the locations; and a second signal transmission line between the second output terminal of said preceding location and the second input terminal of said succeeding location;

each of said plurality of locations being capable of packaging one of said processor and said adapters;

said processor comprising:

signal producing means connected to the first and the second output terminals of said preceding location when said processor is packaged in said preceding location, said signal producing means being for producing a first and a second number signal and a control instruction signal, said first number signal representing an intial integer as a first number, said second number signal representing said initial integer plus an additional integer as a second number, said additional integer being selected from zero to (N−1), said control instruction signal representing a control instruction, said signal producing means being for delivering said first number signal to the first output terminal of said preceding location and said second number signal and said control instruction signal to the second output terminal of said preceding location;

each of said adapters comprising:

detecting means connected to the first input terminal of said succeeding location when said each of the adapters is packaged in said succeeding location, said detecting means being supplied with said first number signal through said first signal transmission line for detecting said first number to produce a detection signal representative of said first number;

sum signal producing means connected to the first input and the first output terminals of said succeeding location when said each of the adapters is packaged in said succeeding location for producing a sum signal representative of a sum of said first number and one to deliver said sum signal as said first number signal to the first output terminal of said succeeding location;

an internal connection line between the second input and the second output terminals of said succeeding location when said each of the adapters is packaged in said succeeding location;

judging means connected to said detecting means always and to the second input terminal of said succeeding location when said each of the adapters is packaged in said succeeding location, said judging means being supplied with said second number signal through said second signal transmission line for judging whether or not said detection signal is coincident with said second number signal to produce a coincidence signal when said detection signal is coincident with said second number signal, said coincidence signal representing that the first number represented by said detection signal indicates the packaged location of said each of the adapters;

controllable operation executing means connected to said judging means always and to the second input terminal of said succeeding location when said each of the adapters is packaged in said succeeding location, said controllable operation executing means being for executing a predetermined operation in accordance with said control instruction represented by said control instruction signal when supplied with said coincidence signal.

5. A packaged location informing system as claimed in claim 4, wherein said initial integer is equal to zero.

6. A packaged location informing system as claimed in claim 4, wherein said initial integer is equal to one.

* * * * *